US012640477B2

(12) United States Patent
Hsu et al.

(10) Patent No.: US 12,640,477 B2
(45) Date of Patent: May 26, 2026

(54) ANTENNA PACKAGE STRUCTURE

(71) Applicant: Advanced Semiconductor Engineering, Inc., Kaohsiung (TW)

(72) Inventors: Shao-En Hsu, Kaohsiung (TW); Huei-Shyong Cho, Kaohsiung (TW); Shih-Wen Lu, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 490 days.

(21) Appl. No.: 18/134,514

(22) Filed: Apr. 13, 2023

(65) Prior Publication Data

US 2024/0347909 A1 Oct. 17, 2024

(51) Int. Cl.

| | |
|---|---|
| ***H01Q 5/307*** | (2015.01) |
| ***H01Q 15/00*** | (2006.01) |
| ***H01Q 19/06*** | (2006.01) |
| ***H01Q 21/06*** | (2006.01) |

(52) U.S. Cl.

CPC ......... *H01Q 5/307* (2015.01); *H01Q 15/0013* (2013.01); *H01Q 21/065* (2013.01); *H01Q 19/062* (2013.01)

(58) Field of Classification Search

CPC .. H01Q 5/307; H01Q 15/0013; H01Q 21/065; H01Q 19/062; H01Q 1/2283; H01Q 15/0026; H01Q 5/42

See application file for complete search history.

(56) References Cited

U.S. PATENT DOCUMENTS

| | | | | |
|---|---|---|---|---|
| 5,208,603 | A * | 5/1993 | Yee | H01Q 15/0026 343/872 |
| 11,322,823 | B2 | 5/2022 | Chiu et al. | |
| 2004/0021607 | A1* | 2/2004 | Legay | H01Q 15/0026 343/909 |
| 2019/0214731 | A1* | 7/2019 | Christie | H01Q 15/008 |

FOREIGN PATENT DOCUMENTS

| | | | | |
|---|---|---|---|---|
| CN | 113285237 A | * | 8/2021 | H01Q 1/50 |
| TW | I676219 B | | 11/2019 | |

* cited by examiner

*Primary Examiner* — Dieu Hien T Duong
(74) *Attorney, Agent, or Firm* — Foley and Lardner LLP

(57) ABSTRACT

The present disclosure provides an antenna package structure, including a first antenna and a first frequency selective surface structure. The first frequency selective surface structure is disposed above the first antenna, and includes a plurality of first patterns and a plurality of second patterns geometrically distinct from the plurality of the first patterns. The plurality of first patterns and the plurality of second patterns are configured to enhance gain and directivity of the first antenna.

3 Claims, 12 Drawing Sheets

ANTENNA PACKAGE STRUCTURE

BACKGROUND

1. Technical Field

The present disclosure relates to an antenna package structure.

2. Description of the Related Art

Radiation loss from an antenna will increase with operating frequency of the electromagnetic signal. Given that a high-frequency electromagnetic signal is transmitted in 5G and 6G frequency bands, to increase the gain of the antenna, emission power of the antenna must be increased commensurately. However, this can cause overheating of the antenna, and with it chances of failure of the antenna. Current techniques dispose a frequency selective surface (FSS) in the antenna to improve the antenna gain and reduce possible overheating. However, when a high-frequency antenna and a low-frequency FSS are set in the same antenna package, the high-frequency FSS can interfere with low-frequency signals, and the low-frequency FSS can interfere with high-frequency signals. If the distance between the high-frequency FSS and the low-frequency FSS is extended to avoid such interference, miniaturization efforts for the antenna package are compromised.

SUMMARY

In one aspect of the present disclosure, an antenna package structure is provided, which includes a first antenna and a first frequency selective surface structure. The first frequency selective surface structure is disposed above the first antenna, and includes a plurality of first patterns and a plurality of second patterns geometrically distinct from the plurality of the first patterns. The plurality of first patterns and the plurality of second patterns are configured to enhance gain and directivity of the first antenna.

In another aspect of the present disclosure, an antenna package structure is provided, which includes a first antenna and a first frequency selective surface structure. The first frequency selective surface structure is disposed above the first antenna, and includes a first group and a second group. The first group has a plurality of first patterns, and is configured to electrically couple to the first antenna. The second group has a plurality of second patterns. A combination of a portion of the plurality of second patterns is configured to be substantially equal to one of the plurality of first patterns, and is electrically coupled to the first antenna.

In yet another aspect of the present disclosure, an antenna package structure is provided, which includes a first antenna, configured to operate in a first frequency; a second antenna, configured to operate in a second frequency higher than the first frequency; and a frequency selective surface structure disposed above the first antenna and the second antenna, and comprising a plurality of first patterns electrically coupled to the first antenna and the second antenna.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
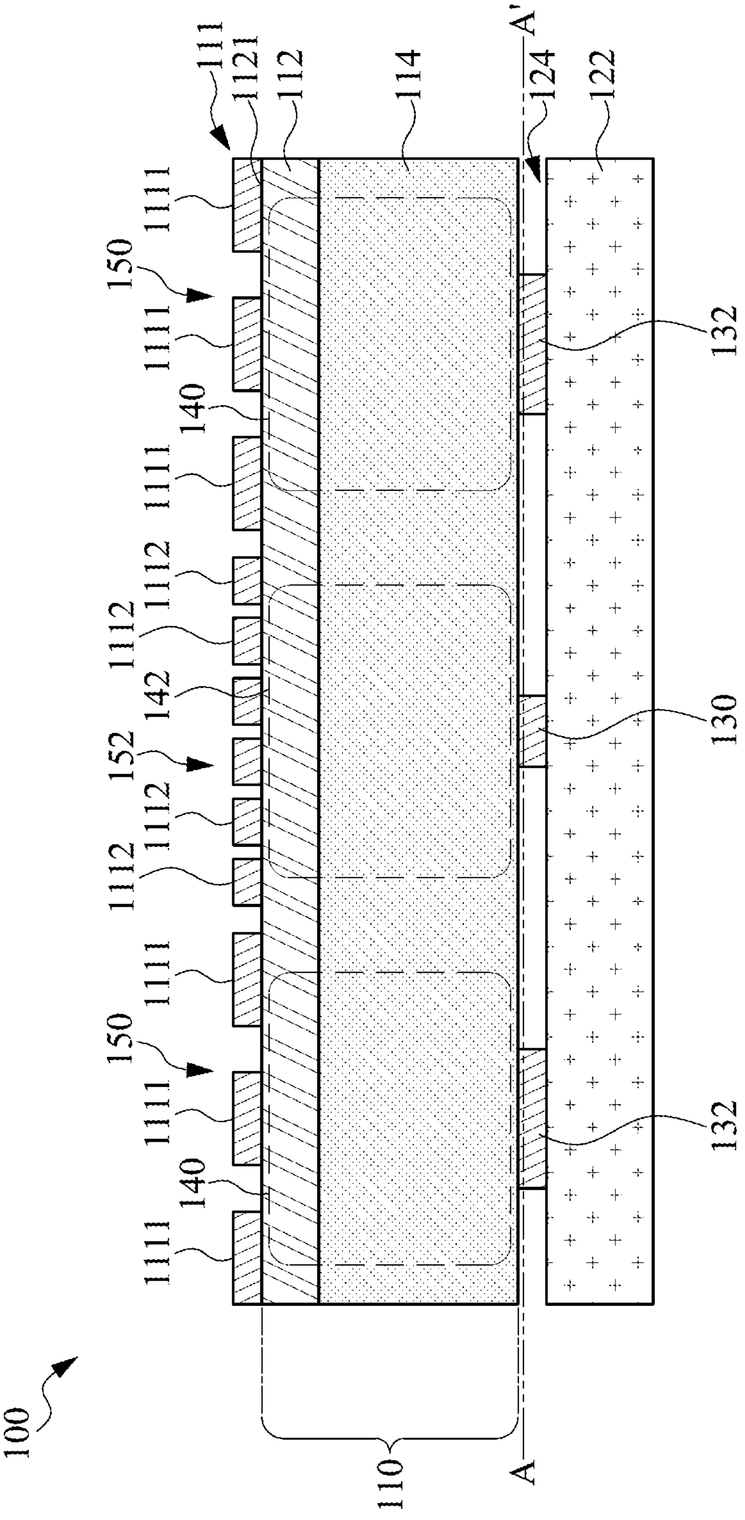
FIG. 1A illustrates a cross-sectional view of an antenna package structure in accordance with an embodiment of the present disclosure.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

The term "layer" as used herein refers to a portion of material comprising a region having a certain thickness. A layer may extend across the entire underlying or superstructure, or may have an extent that is less than the extent of the underlying or superstructure. In addition, a layer may be a region of a homogeneous or heterogeneous continuous structure, the thickness of which is less than that of the continuous structure. For example, a layer may be located between the top and bottom surfaces of the continuous structure or between any pair of horizontal planes therebetween. Layers may extend horizontally, vertically and/or along the tapered surface. A substrate can be one layer, can include one or more layers therein, and/or can have one or more layers thereon, above, and/or below. A layer can include multiple layers. For example, a semiconductor layer may comprise one or more doped or undoped semiconductor layers, and may be of the same or different materials.

It should be noted that the structures, proportions, sizes, etc. shown in the drawings of the specification are only used to match the content recorded in the specification for the understanding and reading of those skilled in the art, and are not used to limit the implementation of this application, so it has no technical substantive meaning. Any modification of structure, change of proportional relationship or adjustment of size, without affecting the effect and purpose of this application, should still fall within the scope of this application. The disclosed technical content must be within the scope covered. At the same time, terms such as “above”, “first”, “second” and “one” quoted in this specification are only for the convenience of description and are not used to limit the scope of implementation of this application. The change or adjustment of the relative relationship shall also be regarded as the implementable scope of the present application without substantive change in the technical content.

It should also be noted that the longitudinal section corresponding to the embodiments of the present application can be a section corresponding to the front view direction, the transverse section can be a section corresponding to the right view direction, and the horizontal section can be a section corresponding to the direction of the top view.

Figure 1B:
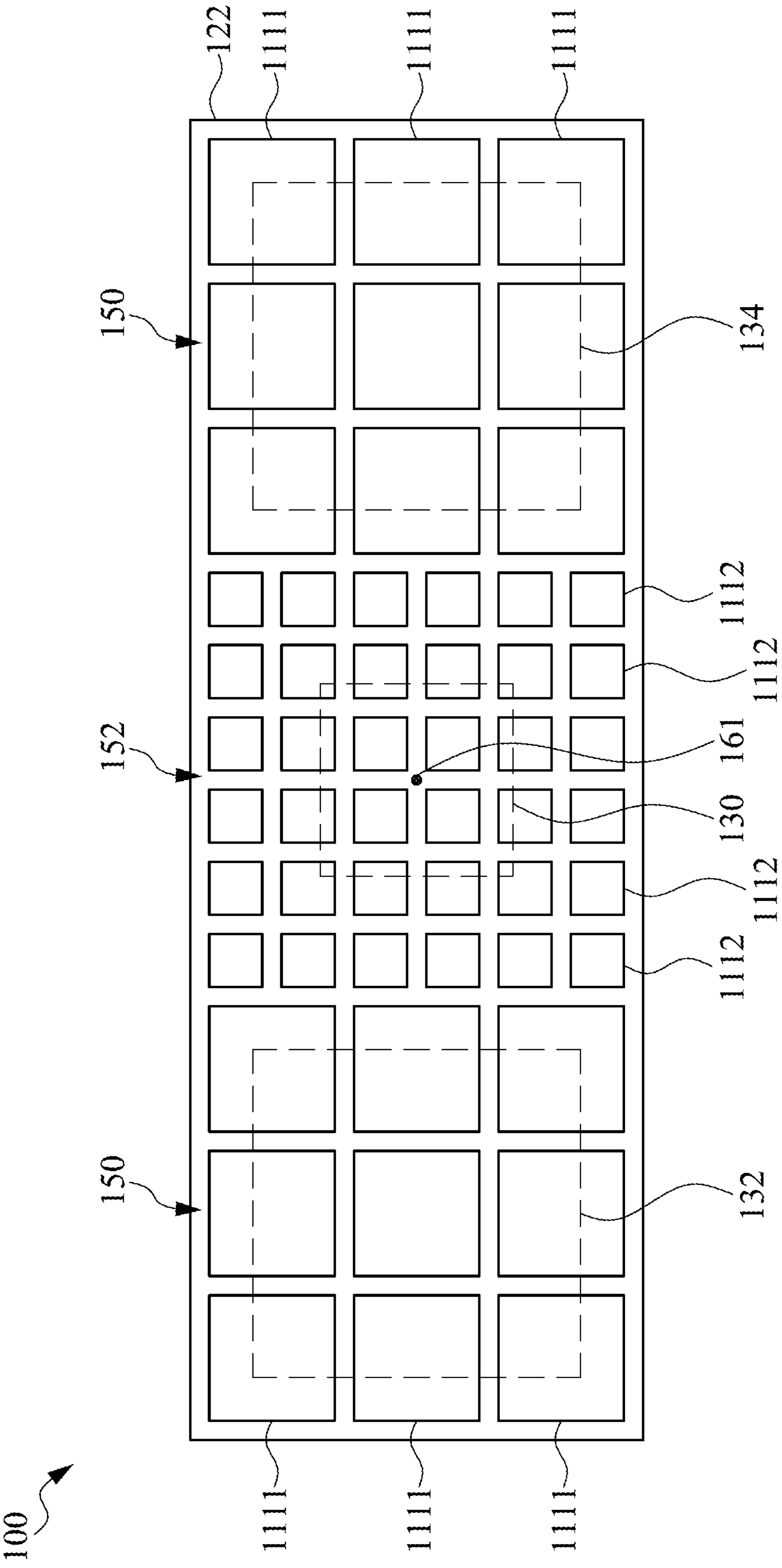
FIG. 1B illustrates a top view of the antenna package structure 100 in accordance with the embodiment of FIG. 1A.

FIG. 1A illustrates a cross-sectional view of an antenna package structure in accordance with an embodiment of the present disclosure. FIG. 1B illustrates a top view of the antenna package structure 100 in accordance with the embodiment of FIG. 1A. Please refer to FIGS. 1A and 1B.

In some embodiments, the antenna package structure 100 may be or include, for example, an antenna device or an antenna package. In some embodiments, the antenna package structure 100 may be or include, for example, a wireless device, such as user equipment (UE), a mobile station, a mobile device, an apparatus communicating with the Internet of Things (IoT), and others. In some embodiments, the antenna package structure 100 may support fifth generation (5G) communications, such as sub-6 GHz frequency bands and/or millimeter (mm) wave (mmWave) frequency bands. For example, the antenna package structure 100 may incorporate both sub-6 GHz devices and mmWave devices. In some embodiments, the antenna package structure 100 may support beyond-5G or 6G communications, such as terahertz (THz) frequency.

In an embodiment, the antenna package structure 100 may include an electromagnetic wave focusing structure 110 and a substrate 122. The electromagnetic wave focusing structure 110 may include a first dielectric element 112 and a second dielectric element 114. In some embodiments, the first dielectric element 112 and the second dielectric element 114 may be a first dielectric layer and a second dielectric layer, respectively.

The substrate 122 may be coupled to the second dielectric element 114 through a conductive layer 124. The substrate 122 may be a substrate composed of conductive material and dielectric material. Here, the dielectric material may include organic and/or inorganic substances, wherein the organic substances may be, for example, polyamide (PA) fiber, polyimide (PI), epoxy resin, poly-p-phenylene benzobisoxazole (PBO) fiber, FR-4 epoxy glass cloth laminate, prepreg (PP) (or semi-cured resin), Ajinomoto Build-up Film (ABF), etc. The inorganic substances may be, for example, Si, glass, ceramics, silicon oxide, silicon nitride, tantalum oxide, etc. The conductive material may include a seed layer and a conductive layer. Here, the seed layer can be, for example, titanium (Ti), tungsten (W), nickel (Ni), etc., while the conductive layer can be a metal layer such as gold (Au), silver (Ag), aluminum (Al), nickel (Ni), palladium (Pd), copper (Cu) or alloys thereof.

In some embodiments, the first dielectric element 112 and the second dielectric element 114 have a first elevation and a second elevation with respect to the substrate 122, with the first elevation higher than the second elevation. In some embodiments, the first dielectric element 112 and the second dielectric element 114 can be implemented by different dielectric materials as described here. It should be noted that a first dielectric constant (Dk1) of a first dielectric material of the first dielectric element 110 may be greater than a second dielectric constant (Dk2) of a second dielectric material of the second dielectric element 114.

In some embodiments, the first dielectric constant (e.g. Dk1) of the first dielectric material of the first dielectric element 112 is greater than the second dielectric constant (e.g., Dk2) of the second dielectric material of the second dielectric element 114. For example, the ranges of the first dielectric constant (e.g., Dk1) and the second dielectric constant (e.g., Dk2) can be as shown in formulae (1) and (2) as follows.

$$7 \leq Dk1 \leq 100 \quad (1)$$

$$1 \leq Dk2 \leq 5 \quad (2)$$

In addition, the first dielectric element 112 is substantially parallel to the second dielectric element 114. The thickness (i.e., heights) of the first dielectric element 112 and the second dielectric element 114 may be expressed as h1 and h2, respectively. The range of the thickness h2 can be expressed by formula (3) as follows.

$$0.1\lambda_g \leq h2 \leq 1\lambda_g \quad (3)$$

wherein $\lambda_g$ denotes the wavelength in the medium for the operating frequency. In this case, the medium refers to the second dielectric material of the second dielectric element 114. The thickness h1 of the first dielectric element 112 is not particularly limited, and an appropriate thickness can be used.

As shown in FIG. 1A, the first dielectric element 112 may have a top surface 1121. The frequency selective surface (FSS) 111 may include a plurality of patterns 1111 and a plurality of patterns 1112. The plurality of patterns 1111 and the plurality of patterns 1112 are disposed on the top surface 1121 of the first dielectric element 112. In addition, the plurality of patterns 1111 and the plurality of patterns 1112 are arranged in a first group 150 and a second group 152, respectively. The first group 150 and the second group 152 on the frequency selective surface 111 are arranged in an alternate fashion. In addition, the first group 150 and the second group 152 may be different two-dimensional arrays, which may be different fixed patterns or dynamically adjusted patterns. In some embodiments, the patterns 1111 and 1112 may be patches implemented by conductive or non-conductive materials.

In the first group 150, the plurality of patterns 1111 are equally spaced apart in a first two-dimensional array so as to match a first operating frequency of the antennas 132. In addition, the size of the patterns 1111 and the gap between neighboring patterns 1111 correspond to the first operating frequency of the antennas 132. In the second pattern, the plurality of patterns 1112 are equally spaced apart in a second two-dimensional array so as to match a second operating frequency of the antennas 130. In addition, the size of the patterns 1112 and the gap between neighboring patterns 1112 correspond to the second operating frequency of the antennas 130.

For example, the first operating frequency of the antennas 132 may be lower than the second operating frequency of the antenna 130. In some embodiments, the antennas 132 and 130 can be regarded as low-band antennas and high-band antennas, respectively. In addition, the number of patterns 1111 is less than the number of patterns 1112 within a given unit area. In other words, the density of the patterns 1111 in the first group 150 is lower than that of the patterns 1112 in the second group 152. In addition, a total area of a predetermined number of the patterns 1112 is equal to an area of one of the first patterns 1111, and the predetermined number is an integer greater than one.

More specifically, the frequency selective surface is a thin, repetitive surface designed to reflect, transmit, or absorb electromagnetic fields based on the frequency of the field. In some embodiments, the patterns 1111 and the patterns 1112 may be square, hexagonal, circular, square, hexagonal loop, circular loop, anchor, or other, depending on practical needs of the antenna package structure 100, and the present disclosure is not limited thereto. In some embodiments, the frequency selective surface 111 may be implemented by a conductive layer with a plurality of first apertures and a plurality of second apertures, where the arrangement of the first apertures and second apertures is designed so that the resonant frequency of the first apertures and second apertures (i.e., FSS elements) matches the operating frequencies of the electromagnetic wave emitted from the antennas 130 and 132, respectively. For purposes of description, the patterns 1111 and patterns 1112 are square patches of different sizes.

Figure 1C:
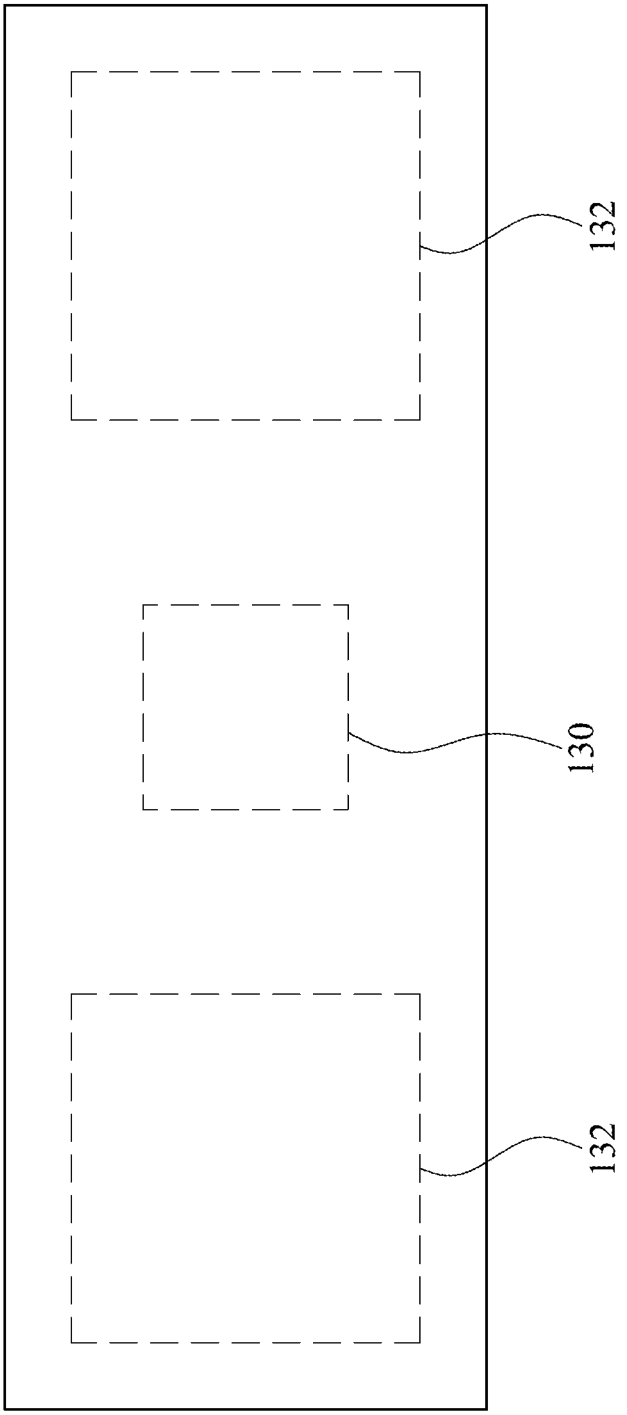
FIG. 1C illustrates a top view of the antenna package structure 100 along line AA' in FIG. 1A.

In some embodiments, the antennas 132 and 130 may be included in the conductive layer 124, and each of the antennas 132 may refer to a standalone antenna or a plurality of antennas (e.g., patch antennas) arranged in a first antenna pattern (e.g., a first two-dimensional array, not shown in FIGS. 1A-1B), and the range of group 150 of the patterns 1111 may cover the antenna 132 from the top view, as shown in FIG. 1B. Similarly, the antennas 130 may be arranged in a second antenna pattern (e.g., a second two-dimensional array, not shown in FIGS. 1A-1B), and the range of group 152 of the patterns 1112 may cover the antenna 130 from the top view, as shown in FIG. 1B. Therefore, the electromagnetic waves emitted by the antennas 132 and 130 can be focused by the electromagnetic wave focusing structure 110, and the details thereof will be described later. For purposes of description, the antennas 132 and 130 are standalone antennas, and a top view of the antenna package structure 100 along line AA' in FIG. 1A is illustrated in FIG. 1C.

In some embodiments, the geometric shape of a predetermined number of the patterns 112 may be substantially equal to the geometric shape of one first pattern 1111. The predetermined number may be two, four, or other numbers, but the present disclosure is not limited thereto. For purposes of description, the geometric shape of four second patterns 1112 arranged in a 2×2 array may be substantially equal to the geometric shape of one first pattern 1111. In some embodiments, the geometric center of the second group 152 may be located at point 161, as shown in FIG. 1B, and the geometric center of the antenna 130 may be also located at point 161. In other words, the geometric center of the second group 152 may be substantially equal to the geometric center of the antenna 130. In addition, the pitch between two neighboring first patterns 1111 may be greater than the pitch between two neighboring second patterns 1112

Figure 1D:
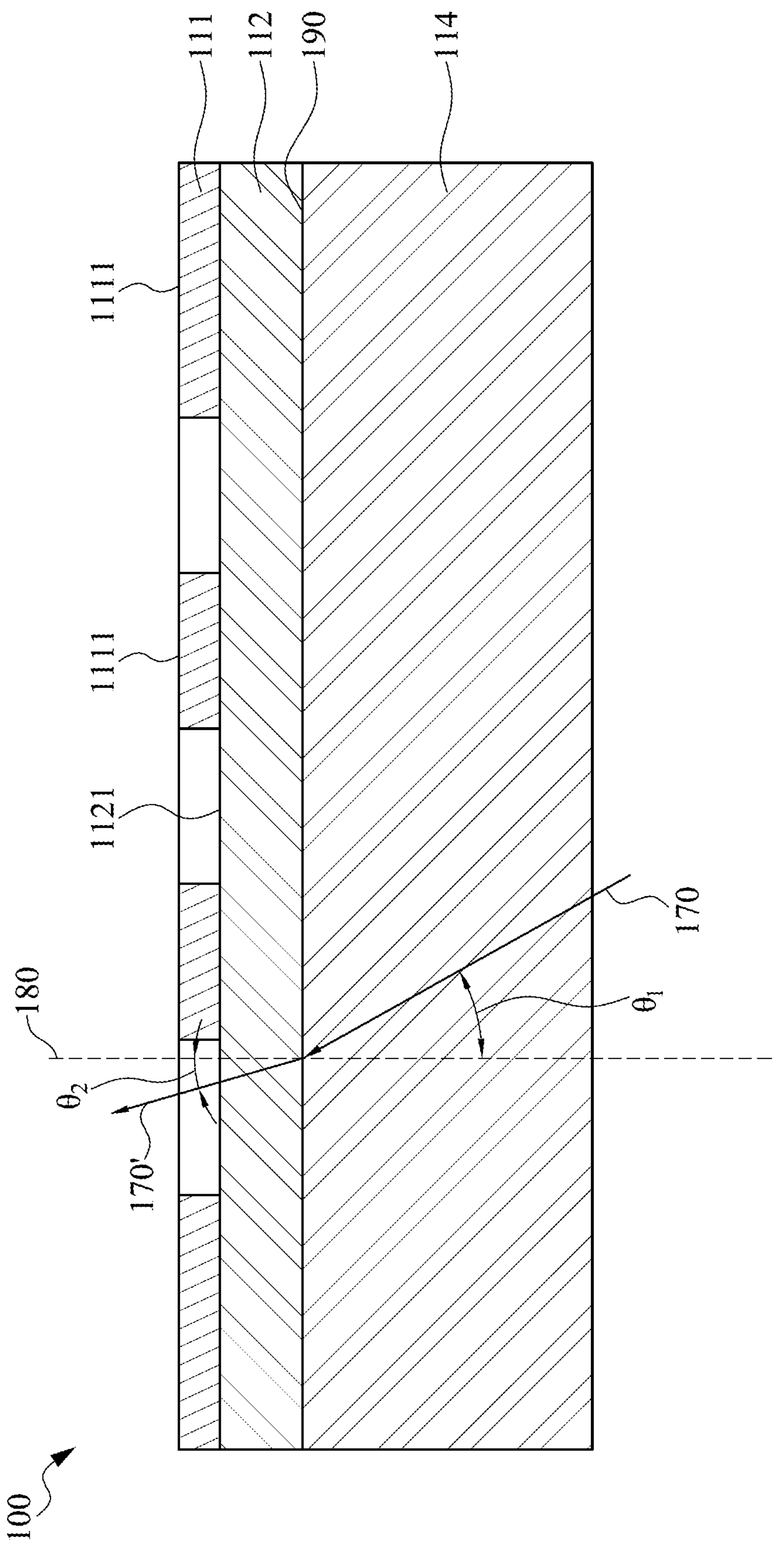
FIG. 1D is a diagram illustrating the incident angle and refraction angle of the electromagnetic wave emitted by the antenna toward the electromagnetic wave focusing structure in accordance with the embodiment of the FIG. 1A.

In FIG. 1D, a portion of the electromagnetic wave focusing structure 110 in FIG. 1A is shown. The electromagnetic wave emitted by the antenna 132 toward the plurality of patterns 1111 has an incident angle $\theta_1$ between the emitted electromagnetic wave 170 and a normal 180 of the boundary between the first dielectric element 112 and the second dielectric element 114. In addition, the electromagnetic wave is refracted by the first dielectric element 112, and the refracted electromagnetic wave has a refraction angle $\theta_2$ between the refracted electromagnetic wave 170' and the normal 180 of the boundary between the first dielectric element 112 and the second dielectric element 114. Since the first dielectric constant Dk1 is greater than the second dielectric constant Dk2, the refraction angle $\theta_2$ is less than the incident angle $\theta_1$. It should be noted that although the refraction phenomenon of the electromagnetic wave 170 emitted by the antenna 132 is described in FIG. 1C, the refraction phenomenon described in FIG. 1C can be applied to the electromagnetic wave emitted by the antenna 130 as well.

Figure 2A:
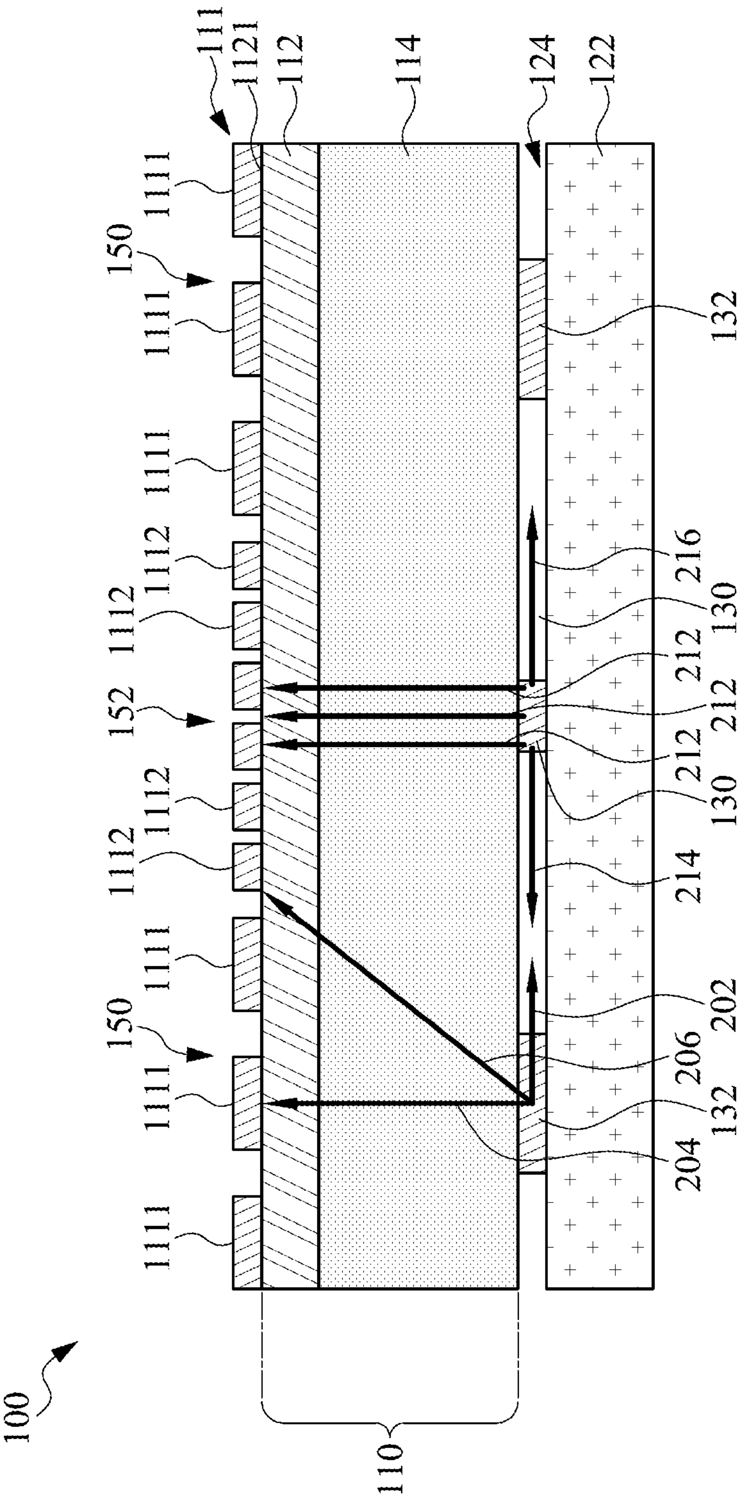
FIG. 2A is another cross-sectional view of the antenna package structure 100 in accordance with the embodiment of FIG. 1A.

FIG. 2A is another cross-sectional view of the antenna package structure 100 in accordance with the embodiment of FIG. 1A. Please refer to FIG. 1A and FIG. 2A.

In FIG. 2A, the electromagnetic waves emitted by antennas 130 and 132 (e.g., arranged in a first antenna pattern and a second antenna pattern, respectively) share the second group 152 of the patterns 1112, and gain and directivities of the first antenna pattern and the second antenna pattern can be enhanced by the shared second group 152. For example, the electromagnetic waves are emitted by the antenna 132 in various directions, such as directions 202, 204, and 206, etc., where direction 204 targets the first group 150 of the patterns 1111 from the antenna 132, and direction 206 targets the second group 152 of the patterns 1112 from the antenna 132. In addition, the electromagnetic waves are emitted by the antenna 130 in directions 212, 214, and 216, where direction 212 targets the second group 152 of the patterns 1112 from the antenna 130. In addition, sizes of patterns 1112 are specifically designed so the second group 152 thereof can support multiple resonant frequencies, such as the operating frequencies of the electromagnetic wave emitted from the antennas 130 and 132.

In some embodiments, for brevity, the size of one first pattern 1111 (e.g., a larger square patch) may be four times the size of one second pattern 1112 (e.g., a smaller square patch), but the present disclosure is not limited thereto. In other words, the size of four patterns 1112 arranged in a 2×2 array is substantially equal to the size of one first pattern 1111. Since the antenna 132 has a lower operating frequency, it indicates that the wavelength of the electromagnetic wave emitted by the antenna 132 is longer. As such, the gap between two neighboring patterns 1112 can be neglected in comparison with the relatively longer wavelength of the electromagnetic wave emitted by the antenna 132, and the second group 152 of the patterns 1112 can have resonance with the electromagnetic wave (i.e., a lower operating frequency) emitted by the antenna 132 in addition to the resonance with the electromagnetic wave (i.e., a higher operating frequency) emitted by the antenna 130.

Specifically, the size of the patterns 1111 and the gap between neighboring patterns 1111 in the first group 150 are designed to enhance the gain of the antenna 132. In addition, the second group 152 of the patterns 1112 can be resonant to the operating frequency of the electromagnetic wave emitted by the antenna 132, the gain of the antenna 132 (e.g., first antenna pattern) can be enhanced by the second group 152 of the patterns 1112. In other words, the first group 150 and the second group 152 can enhance gain of the antenna 132 (e.g., first antenna pattern). In addition, due to the design of the electromagnetic wave focusing structure 110 which includes two dielectric elements of different dielectric constants (i.e., the upper dielectric element has a higher dielectric constant, and the lower dielectric element has a lower dielectric constant) as shown in FIG. 2A, the directivities of the antenna 132 (e.g., first antenna pattern) and the antenna 130 (e.g., second antenna pattern) can be enhanced as well.

In another aspect of the present disclosure, the size of the patterns 1112 and the gap between neighboring patterns 1112 in the second group 152 are designed to enhance gain of the antennas 130 (e.g., second antenna pattern). In addition, the second group 152 of the patterns 1112 can be resonant to the operating frequency of the electromagnetic wave emitted by the antenna 132, and thus gain of the antenna 132 (e.g., first antenna pattern) can be enhanced by the second group 152 of the patterns 1112. In other words, the second group 152 of the patterns 1112 can enhance gain of the antenna 132 (e.g., first antenna pattern) and antenna 130 (e.g., second antenna pattern). Similarly, due to the design of the electromagnetic wave focusing structure 110 which includes two dielectric elements of different dielectric constants (i.e., the upper dielectric element has a higher dielectric constant, and the lower dielectric element has a lower dielectric constant) as shown in FIG. 2A, the directivities of the antenna 132 (e.g., first antenna pattern) and the antenna 130 (e.g., second antenna pattern) can be enhanced as well.

Figure 2B:
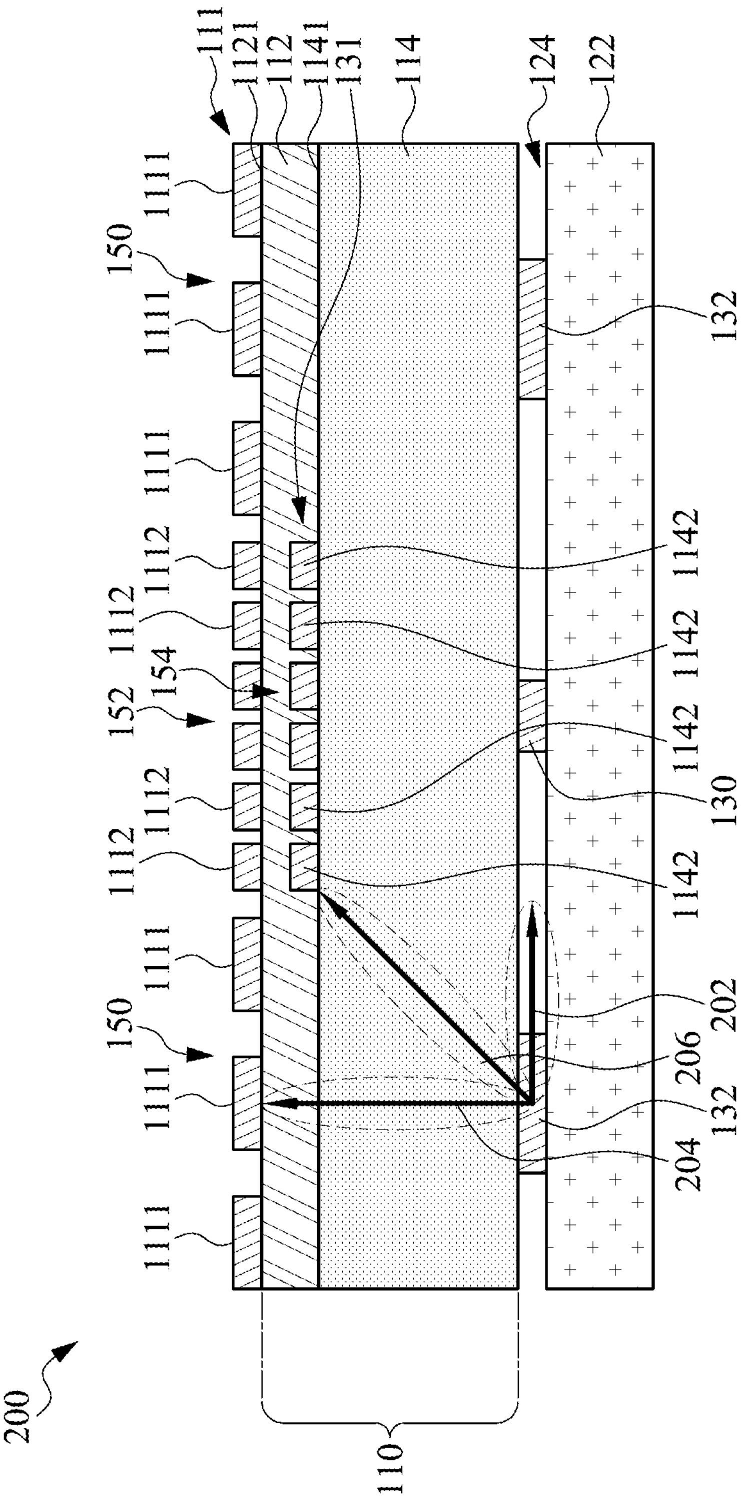
FIG. 2B is a cross-sectional view of the antenna package structure 200 in accordance with another embodiment of the present disclosure.

FIG. 2B is a cross-sectional view of the antenna package structure 200 in accordance with another embodiment of the present disclosure.

The antenna package structure 200 shown in FIG. 2B is similar to the antenna package structure 100 shown in FIG. 2A, with the difference therebetween that the antenna package structure 200 in FIG. 2B further includes a plurality of patterns 1142 disposed on a top surface 1141 of the second dielectric element 114, and the patterns 1142 are arranged in a third group 154. Thus, two sets of patterns (e.g., patterns 1112 and 1142) are disposed above the antennas 130.

Specifically, the size of the patterns 1142 and the gap between neighboring patterns 1142 may be similar to those of the patterns 1112. In addition, the direction 206 of the electromagnetic wave emitted by the antenna 132 may target the third group 154 of the patterns 1142, and thus the third group 154 of the patterns 1142 can be resonant to the operating frequency of the electromagnetic wave emitted by the antenna 132 as the second group 152 described in the embodiment of FIG. 2A. Therefore, the gain of the electromagnetic wave emitted by the antenna 132 can be enhanced by the third group 154 of the patterns 1142. Moreover, the electromagnetic wave enhanced by the third group 154 still travels outward to the frequency selective surface 111, and it can be further focused by the second group 152, thereby enhancing the directivity of the electromagnetic wave emitted by the antenna 132. Thus, the second group 152 can be regarded as a "director" in this embodiment.

In some embodiments, the third group 154 is substantially equal to the second group 152, and the range of the second group 152 may cover the range of the third group 154 from the top view of the antenna package structure 200 (not shown). In addition, each of the patterns 1142 of the third group 154 may substantially align with each of the patterns 1112 of the second group 152. Alternatively, the patterns 1142 of the third group 154 and the patterns 1112 of the second group 152 may be arranged in an interleaved fashion from the top view, depending on practical needs.

Similarly, due to the design of the electromagnetic wave focusing structure 110 which includes two dielectric elements of different dielectric constants (i.e., the upper dielectric element has a higher dielectric constant, and the lower dielectric element has a lower dielectric constant) as shown in FIG. 2B, directivities of the antenna 132 (e.g., first antenna pattern) and the antenna 130 (e.g., second antenna pattern) can be enhanced as well.

Figure 3:
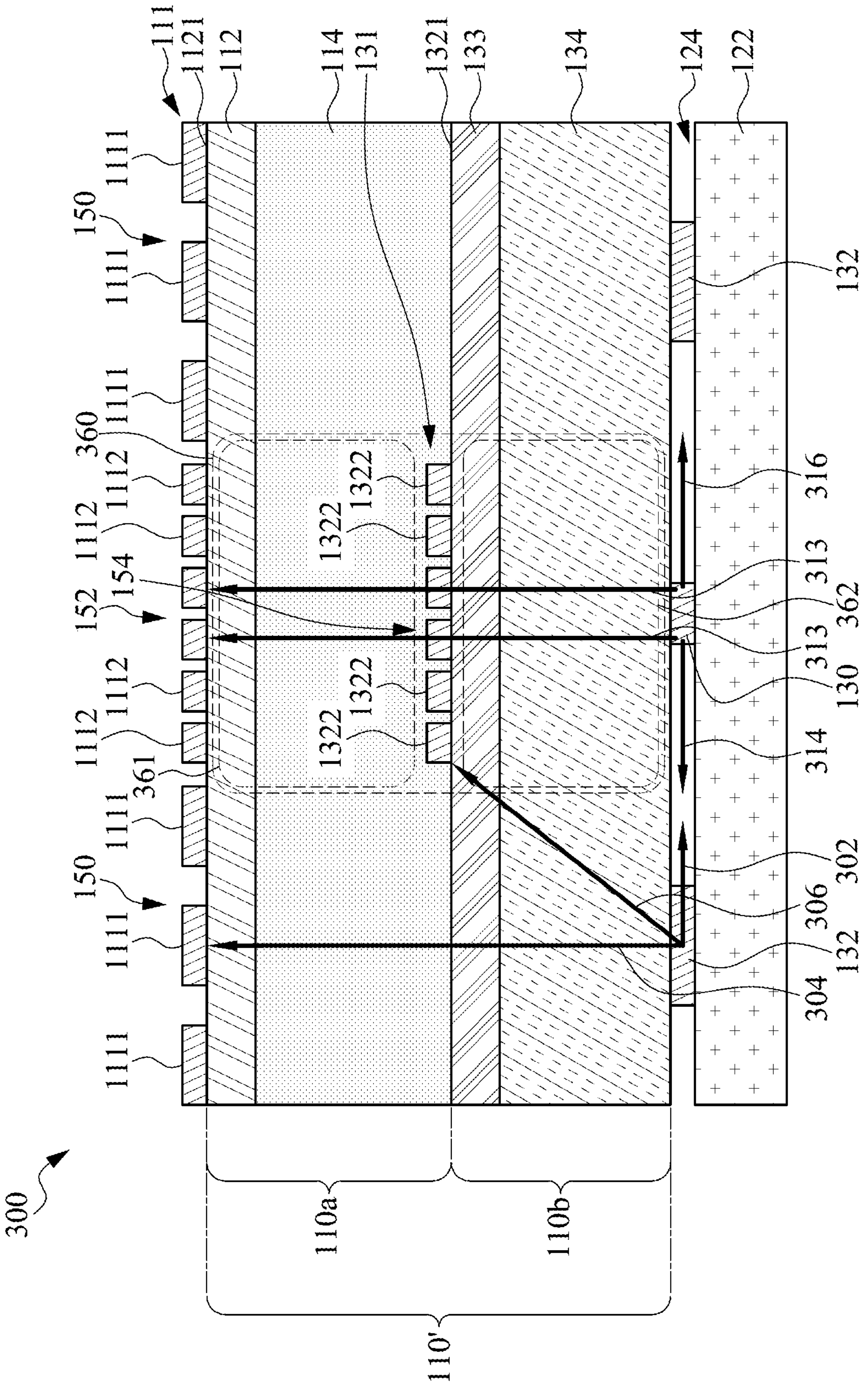
FIG. 3 is a cross-sectional view of the antenna package structure 300 in accordance with yet another embodiment of the present disclosure.

FIG. 3 is a cross-sectional view of the antenna package structure 300 in accordance with yet another embodiment of the present disclosure.

The antenna package structure 300 shown in FIG. 3 is similar to the antenna package structure 200 shown in FIG. 2B, with the difference therebetween that the antenna package structure 300 includes a first electromagnetic wave focusing structure 110*a* and a second electromagnetic wave focusing structure 110*b*. In addition, the first electromagnetic wave focusing structure 110*a* and the second electromagnetic wave focusing structure 110*b* can be collectively regarded as an electromagnetic wave focusing structure 110'.

The first electromagnetic wave focusing structure 110*a* includes a first dielectric element 112 and a second dielectric element 114. The second electromagnetic wave focusing structure 110*b* includes a third dielectric element 133 and a fourth dielectric element 134. For example, the patterns 1111 and 1112 are disposed on the top surface 1121 of the first dielectric element 112, and arranged in the first group 150 and the second group 152, similar to the electromagnetic wave focusing structure 110 in FIG. 1A. Moreover, the first dielectric constant (Dk1) of the first dielectric material of the first dielectric element 112 is greater than the second dielectric constant (Dk2) of the second dielectric material of the second dielectric element 114.

A plurality of patterns 1322 are disposed on a top surface 1321 of the third dielectric element 133, and arranged in a third pattern. Thus, two sets of patterns (e.g., patterns 1112 and 1322) are disposed above the antennas 130. In addition, the third dielectric constant (Dk3) of the third dielectric material of the third dielectric element 133 is greater than the fourth dielectric constant (Dk4) of the fourth dielectric material of the fourth dielectric element 134. Furthermore, the second dielectric constant (Dk2) of the second dielectric material of the second dielectric element 114 is greater than or equal to the third dielectric constant (Dk3) of the third dielectric material of the third dielectric element 133. Therefore, the relationships between the first dielectric constant (Dk1), second dielectric constant (Dk2), third dielectric constant (Dk3), and fourth dielectric constant (Dk4) can be expressed by formula (1) as follows.

$$Dk4 < Dk3 \leq Dk2 < Dk1 \quad (1)$$

Specifically, a dielectric element at a relatively low position may have a relatively low dielectric constant, and the electromagnetic wave emitted by the antenna 132 or 130 may travel from one dielectric element having a lower dielectric constant to another dielectric element having a higher dielectric constant. Thus, the electromagnetic wave is refracted by the dielectric element having a greater dielectric constant, and the refracted electromagnetic wave becomes closer to the normal of the boundary between these two dielectric elements of different dielectric constants. Therefore, the electromagnetic wave emitted by the antenna 132 or 130 can be focused by the electromagnetic wave focusing structure 110' in the antenna package structure 300, thereby enhancing the directivity of the antennas 132 and 130. In some embodiments, the first electromagnetic wave focusing structure 110*a* and the second electromagnetic wave focusing structure 110*b* may be referred to as a first dielectric structure and a second dielectric structure, respectively, and a first equivalent dielectric constant of the first electromagnetic wave focusing structure 110*a* is greater than a second equivalent dielectric constant of the second electromagnetic wave focusing structure 110*b*.

It should be noted that the lower portion of the antenna package structure 300 in FIG. 3, which includes the electromagnetic wave focusing structure 110*b* and the substrate 122, is similar to the antenna package structure 100 shown in FIG. 1A. The electromagnetic wave focusing structure 110*a* may be similar to the electromagnetic wave focusing structure 110*b*, and is stacked on the electromagnetic wave focusing structure 110*b* to enhance gain and directivity of the electromagnetic waves emitted by the antenna 130. For example, the patterns 1322 of the second electromagnetic wave focusing structure 110*b* and the substrate 122 may define a resonant cavity 362. In addition, the patterns 1112 of the first electromagnetic wave focusing structure 110*a* and the electromagnetic wave focusing structure 110*b* may define another resonant cavity 361. The resonant cavities 361 and 362 can be collectively regarded as a resonant cavity 360. Thus, the gain and directivity of the electromagnetic waves emitted by the antenna 130 can be enhanced by the resonant cavity 362 a first time, and then enhanced by the resonant cavity 361 for a second time. Therefore, the gain and directivity of the electromagnetic waves emitted by the antenna 130 can be improved by use of the antenna package structure 300, and performance of the antenna 130 in high-frequency bands improved accordingly.

Regarding the antenna 132, there is one resonant cavity 363 defined by the patterns 1111 and the substrate 122, and the low-frequency electromagnetic wave emitted by the antenna 132 can be enhanced by the resonant cavity 363.

Specifically, the size of the patterns 1322 and the gap between neighboring patterns 1322 may be similar to those of the patterns 1112. In addition, the direction 306 of the electromagnetic wave emitted by the antenna 132 may target the third group 154 of the patterns 1322, and thus the third group 154 of the patterns 1322 can be resonant to the operating frequency of the electromagnetic wave emitted by the antenna 132 as the second group 152 described in the embodiment of FIG. 2A. Therefore, the gain of the electromagnetic wave emitted by the antenna 132 can be enhanced by the third group 154 of the patterns 1322. Moreover, the electromagnetic wave enhanced by the third group 154 still travels outward to the frequency selective surface 111, and it can be further focused by the second group 152, thereby enhancing the directivity of the electromagnetic wave emitted by the antenna 132. Thus, the second group 152 can be regarded as a “director” in this embodiment.

In some embodiments, the third group 154 is substantially equal to the second group 152, and the range of the second group 152 may cover the range of the third group 154 from the top view of the antenna package structure 300 (not shown). In addition, each of the patterns 1322 of the third group 154 may be substantially aligned with each of the patterns 1112 of the second group 152. Alternatively, the patterns 1322 of the third group 154 and the patterns 1112 of the second group 152 may be arranged in an interleaved fashion from the top view, depending on practical needs.

Similarly, due to the electromagnetic wave focusing structure 110 including two dielectric elements of different dielectric constants (i.e., the upper dielectric element has a higher dielectric constant, and the lower dielectric element has a lower dielectric constant) as shown in FIG. 2B, the directivities of the antenna 132 (e.g., first antenna pattern) and the antenna 130 (e.g., second antenna pattern) can be enhanced as well.

Figure 4A:
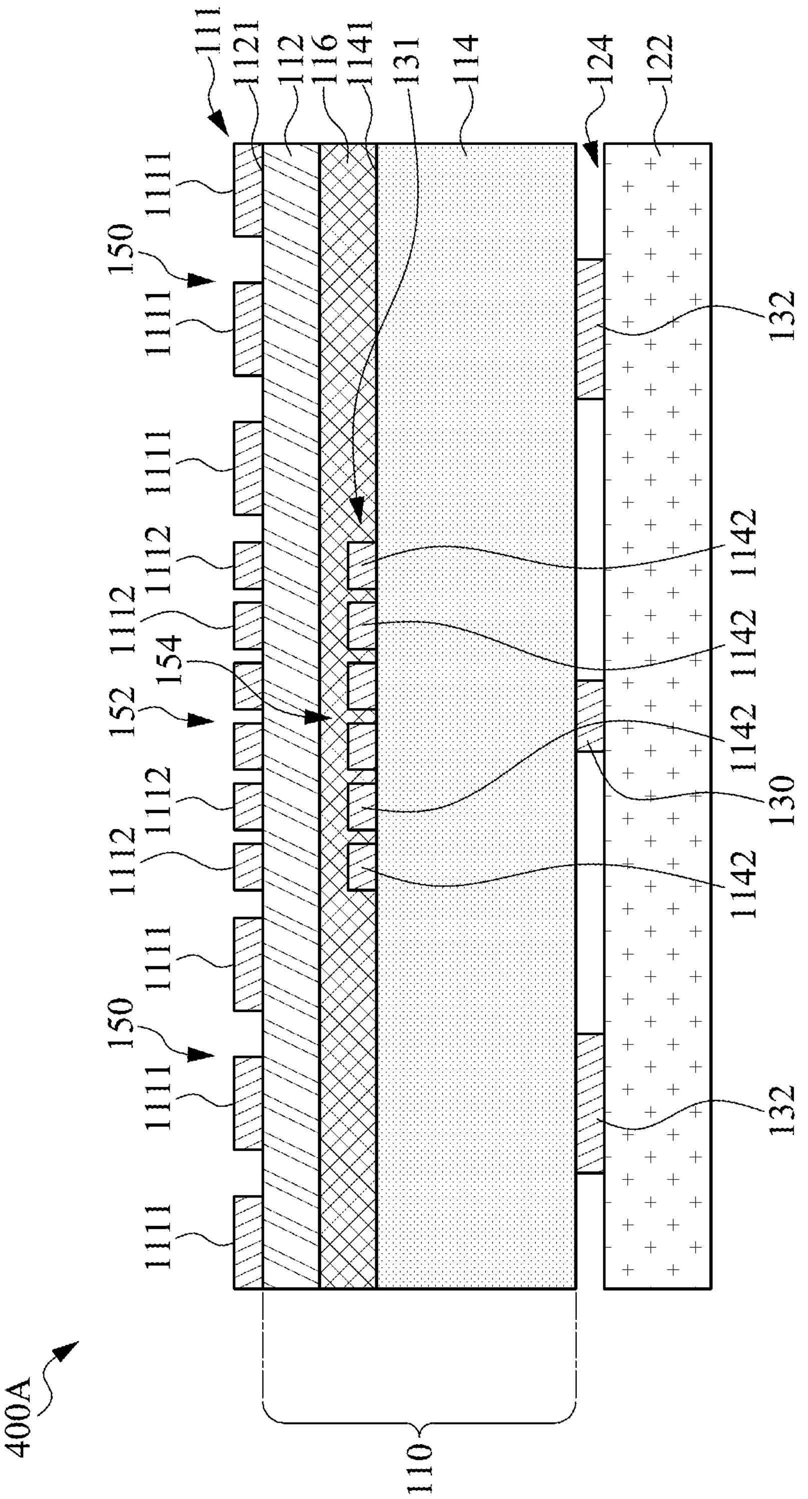
FIGS. 4A-4C are different cross-sectional views of the antenna package structure 400A-400C in accordance with different embodiments of the present disclosure.
Figure 4B:
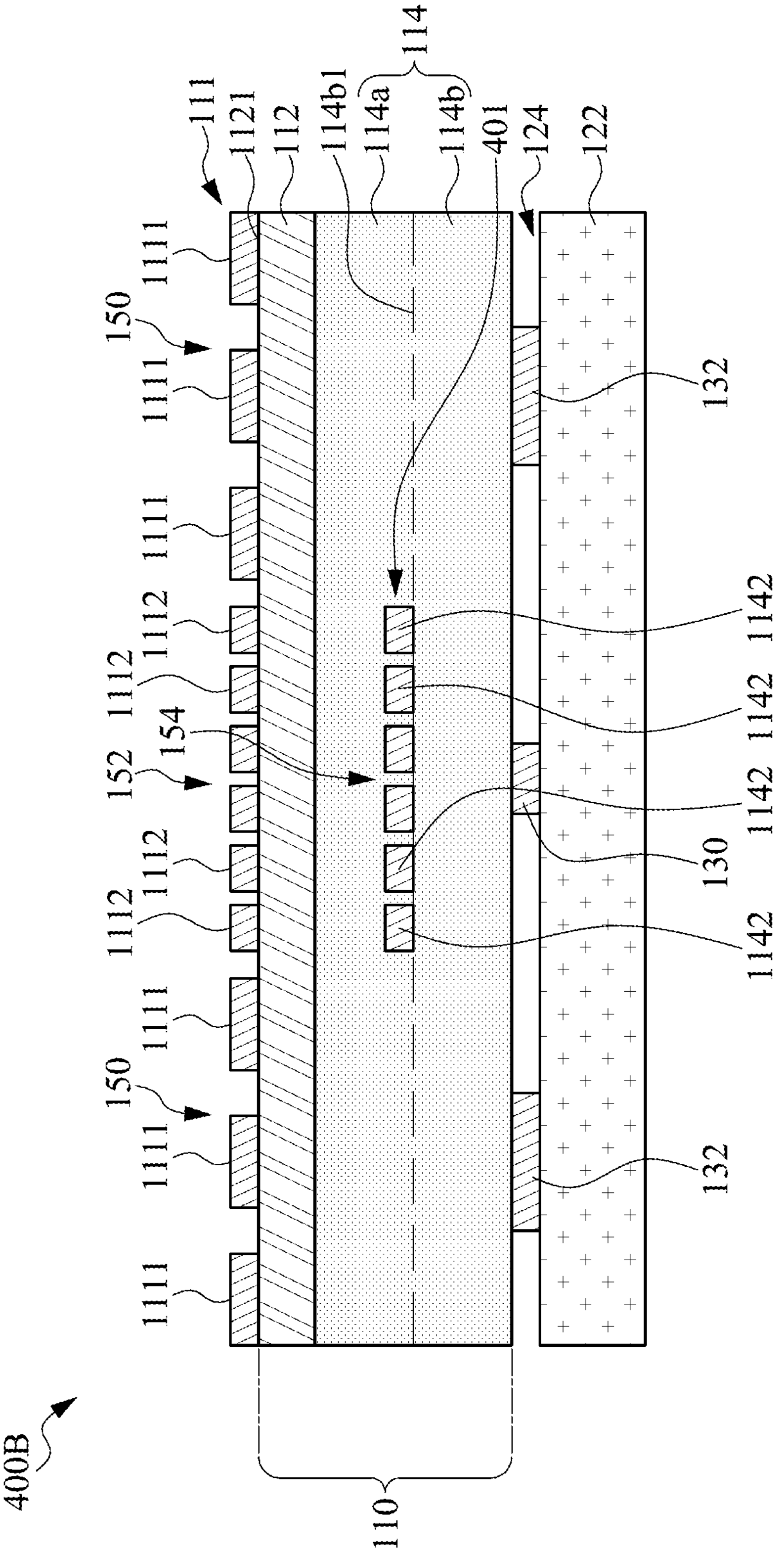
Figure 4C:
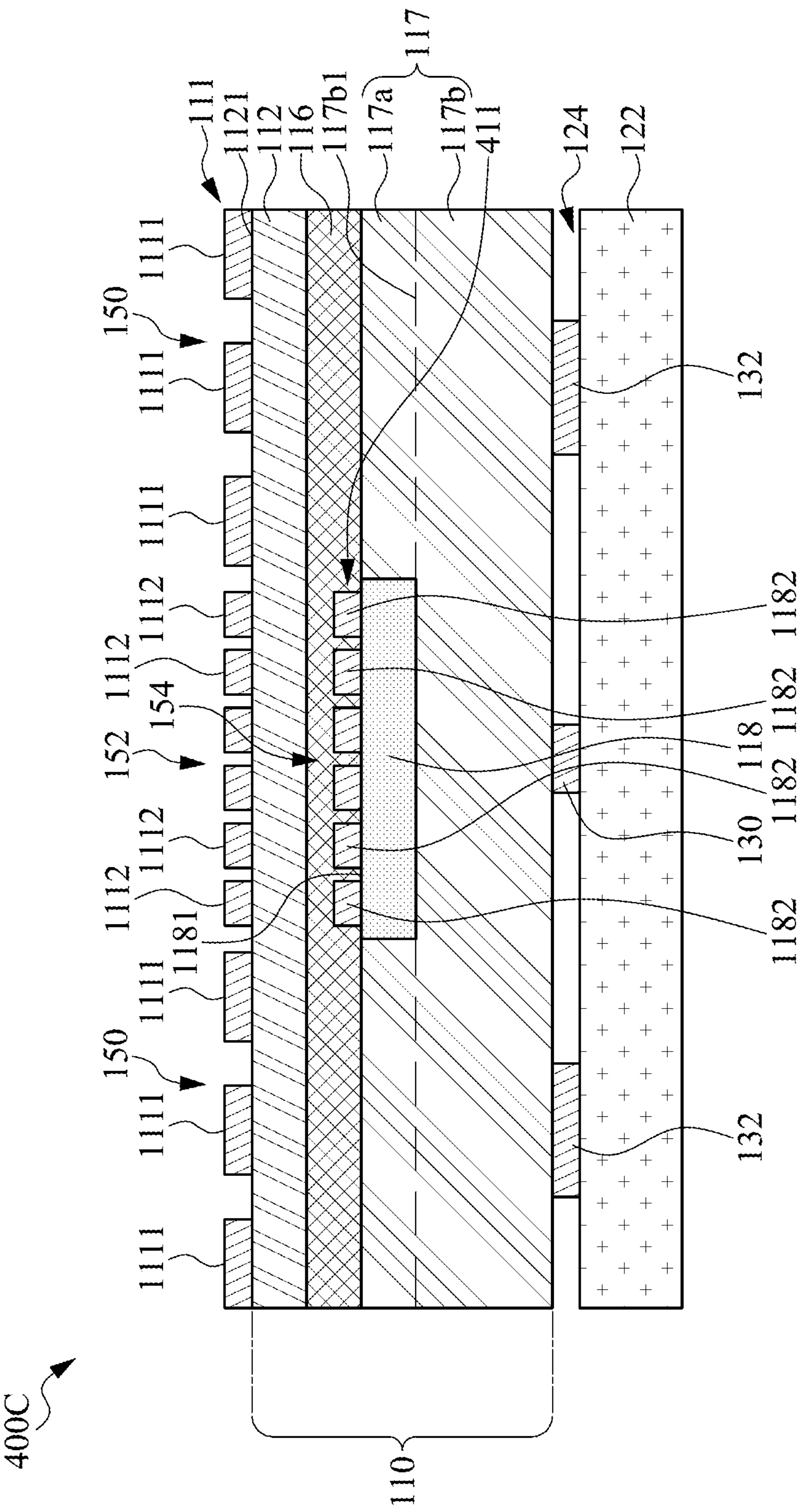

FIGS. 4A-4C are different cross-sectional views of the antenna package structure 400A-400C in accordance with different embodiments of the present disclosure.

Please refer to FIG. 4A. The antenna package structure 400A shown in FIG. 4A is similar to the antenna package structure 100 shown in FIG. 1A, with the difference therebetween that the electromagnetic wave focusing structure 110 in the antenna package structure 400A includes three dielectric elements arranged in a stacked manner, namely, a first dielectric element 112, a second dielectric element 114, and a third dielectric element 116. In addition, a plurality of patterns 1142 are disposed on a top surface 1141 of the second dielectric element 114.

The first dielectric element 112 and the second dielectric element 114 in FIG. 4A may be similar to those in the embodiment of FIG. 1A. In addition, the third dielectric element 116 is disposed between the first dielectric element 112 and the second dielectric element 114, and the third dielectric constant (Dk3) of the third dielectric material of the third dielectric element 116 may be between the first dielectric constant (Dk1) of the first dielectric element 112 and the second dielectric constant (Dk2) of the second dielectric element 114. Thus, the relationships between the first dielectric constant (Dk1), the second dielectric constant (Dk2), and the third dielectric constant (Dk3) can be expressed by formula (2) as follows.

$$Dk2<Dk3<Dk1 \quad (2)$$

Therefore, the antenna package structure 400A in FIG. 4A can focus the electromagnetic waves emitted by the antennas 130 and 132, and the details thereof can be referred to in the embodiments of FIG. 2B and FIG. 3.

Please refer to FIG. 4B. The antenna package structure 400B shown in FIG. 4B is similar to the antenna package structure 100 shown in FIG. 1A, with the difference therebetween that the electromagnetic wave focusing structure 110 in the antenna package structure 400B includes the third set of patterns 1142 disposed inside the second dielectric element 114, and the patterns 1142 are arranged in a third group 154. For example, in manufacture of the antenna package structure 400B, the lower portion 114*b* of the second dielectric element 114 is first formed on the conductive layer 124. The patterns 1142 are then formed on the top surface 114*b*1 of the lower portion 114*b* of the second dielectric element 114. Next, the upper portion 114*a* of the second dielectric element 114 is formed on the top surface 114*b*1 of the lower portion 114*b*, and therefore the patterns 1142 can be disposed inside the second dielectric element 114.

Therefore, the antenna package structure 400B in FIG. 4B can focus the electromagnetic waves emitted by the antennas 130 and 132, with details thereof referred to in the embodiments of FIG. 2B and FIG. 3.

Please refer to FIG. 4C. The antenna package structure 400C shown in FIG. 4C is similar to the antenna package structure 100 shown in FIG. 1A, with the difference therebetween that the electromagnetic wave focusing structure 110 in the antenna package structure 400C includes four dielectric elements, such as a first dielectric element 112, a second dielectric element 116, a third dielectric element 117, and a fourth dielectric element 118, and a third set of patterns 1182 are disposed on a top surface 1181 of the fourth dielectric element 118. In order to enhance gain and directivity of the electromagnetic wave emitted by the antenna 130 (i.e., high-band antenna), the antenna package structure 400C is used. For example, when implementing the antenna package structure 400C, the lower portion 117*b* of the third dielectric element 117 is first formed on the conductive layer 124, and the fourth dielectric element 118 is then formed on a top surface 117*b*1 of the lower portion 117*b*. Next, the upper portion 117*a* of the third dielectric element 117 is formed on the top surface 1181 of the 117*b*1 other than the region of the fourth dielectric element 118, and the patterns 1182 are formed on the top surface 1181 of the fourth dielectric element 118. Then the second dielectric element 116 and the first dielectric element 112 are formed in sequence, and, finally patterns 1111 and 1112 are formed on the top surface 1121 of the first dielectric element 112 to obtain the antenna package structure 400C.

In addition, the dielectric constants (e.g., Dk1, Dk2, Dk4, and Dk3) of the dielectric elements 112, 116, 118, and 117 from top to bottom are decreased. In other words, the first dielectric constant (Dk1) of the first dielectric element 112 (i.e., the topmost dielectric element) is the highest among these dielectric constants, and the third dielectric constant (Dk3) of the third dielectric element 117 (i.e., the bottom dielectric element) the lowest. Specifically, a dielectric element at a relatively low position may have a relatively low dielectric constant, and the electromagnetic wave emitted by the antenna 132 or 130 may travel from one dielectric element having a lower dielectric constant to another dielectric element having a higher dielectric constant. It should be noted that electromagnetic wave emitted by the antennas 130 may travel through the dielectric elements 117, 118, 116, and 112 in sequence while the electromagnetic wave emitted by the antenna 132 may travel through the dielectric elements 117, 116, and 112 in sequence.

Specifically, the electromagnetic wave is refracted by the dielectric element having a greater dielectric constant, and the refracted electromagnetic wave moves closer to the normal of the boundary between these two dielectric elements of different dielectric constants. Therefore, the electromagnetic wave emitted by the antenna 132 or 130 can be focused by the electromagnetic wave focusing structure 110 in the antenna package structure 400C, thereby enhancing the directivity of the antennas 132 and 130. Moreover, the antenna package structure 400C in FIG. 4C also has resonant cavities similar to the antenna package structure 300 in FIG. 3, and thus gain and directivity of the electromagnetic waves emitted by the antennas 130 and 132 can be improved using the antenna package structure 400C, and performance of the antenna 130 in high-frequency bands improved accordingly.

Figure 5A:
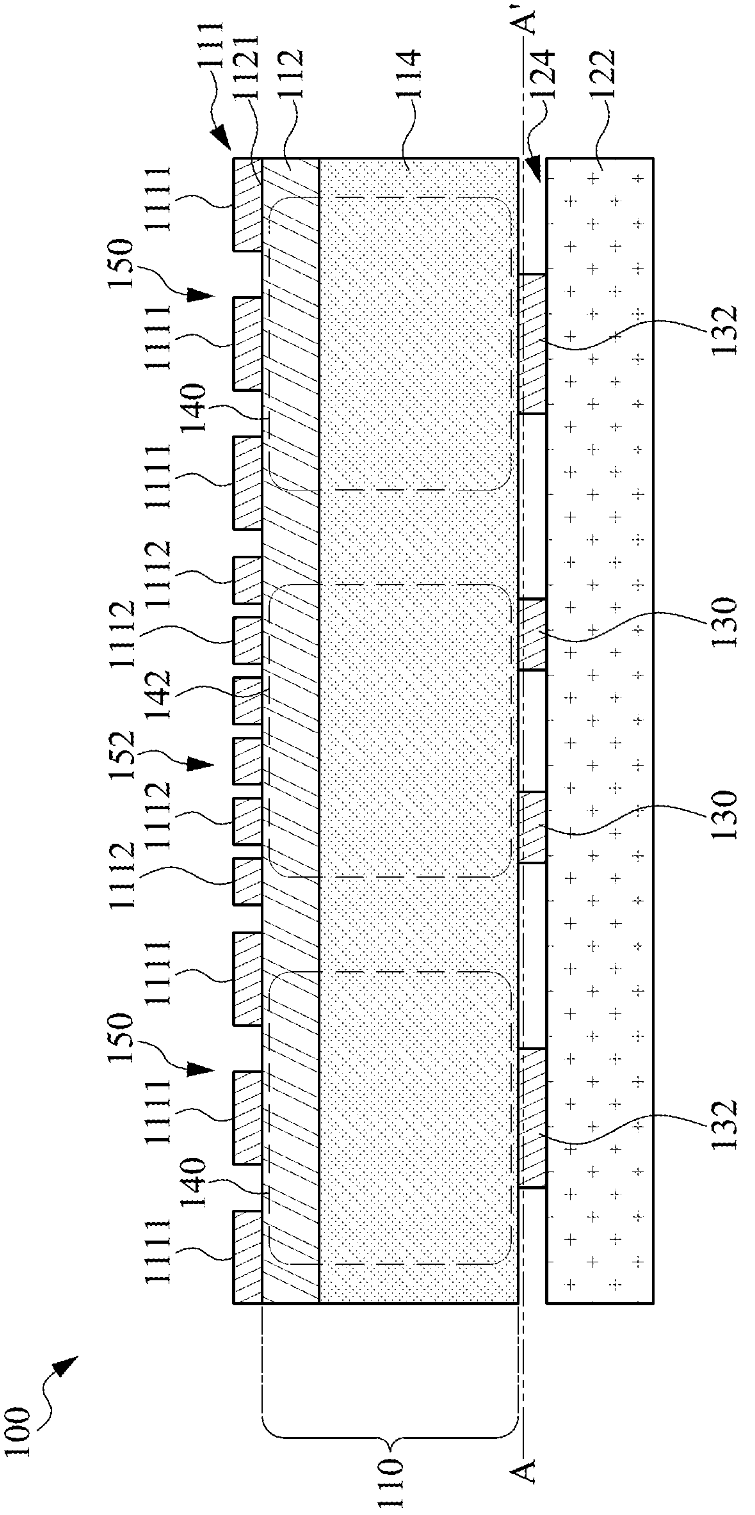
FIG. 5A illustrates a cross-sectional view of an antenna package structure in accordance with yet another embodiment of the present disclosure.
Figure 5B:
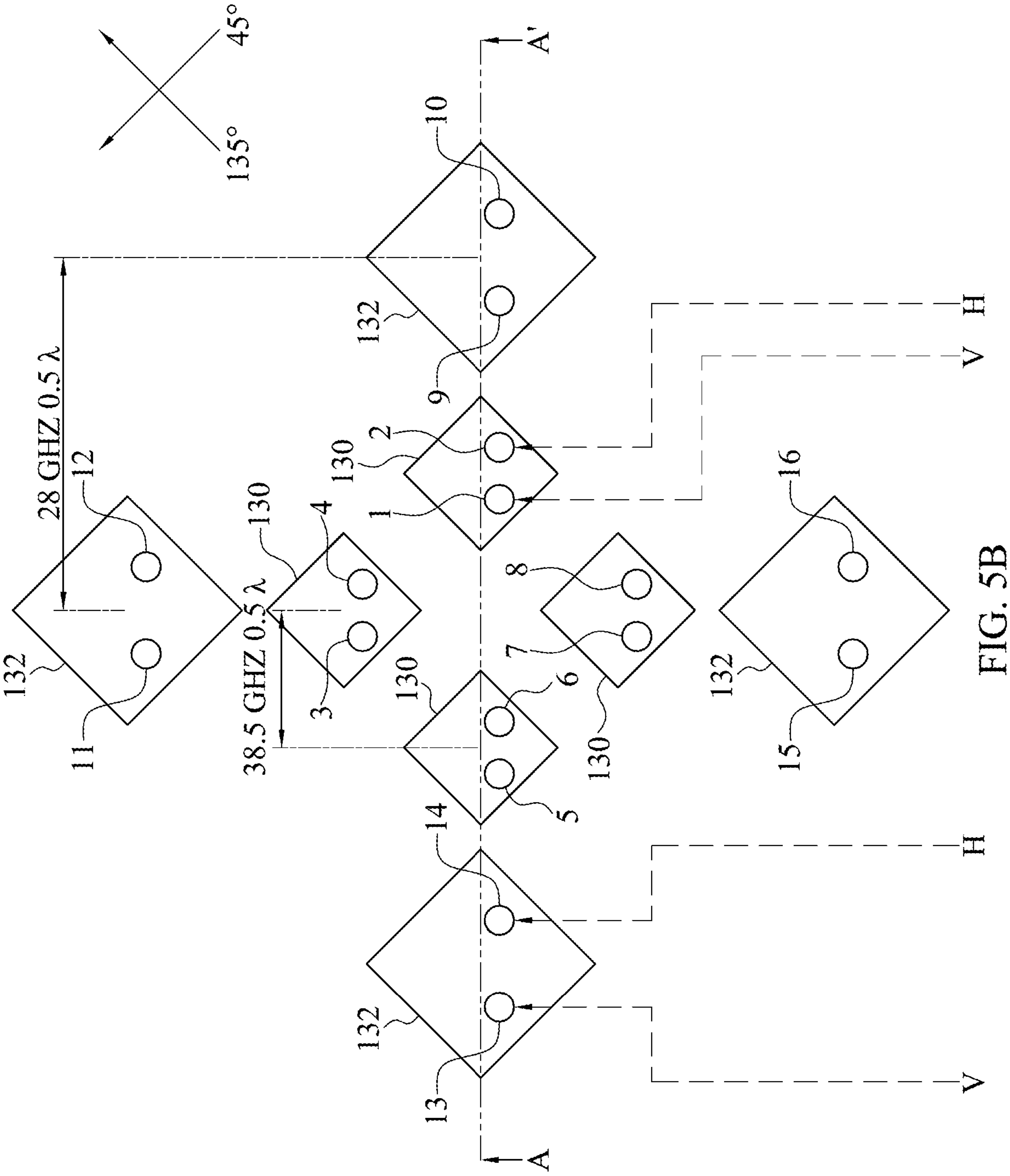
FIG. 5B is a top view of the antennas 132 and 130 on the conductive layer 124 in accordance with the embodiment of FIG. 5A.

FIG. 5A illustrates a cross-sectional view of an antenna package structure in accordance with yet another embodiment of the present disclosure. FIG. 5B is a top view of the antennas 132 and 130 on the conductive layer 124 in accordance with the embodiment of FIG. 5A. Please refer to FIG. 1A and FIGS. 5A-5B.

The antenna package structure 500 in FIG. 5A may be similar to the antenna package structure 100 in FIG. 1A with the difference therebetween that the antenna package structure 500 in FIG. 5A is The top view in FIG. 5B may be applied to embodiments of FIG. 5A. For purposes of description, the antenna package structure 500 in FIG. 5A is used for reference. In an embodiment, the dimensions and positions of the antennas 132 and 130 (i.e., the first antenna pattern and the second antenna pattern) can be designed so the antenna package structure 100 can support dual bands, such as a high-frequency band and a low-frequency band. In some embodiments, the antenna 132 may support the operating frequency of 28 GHz, and the antenna 130 may support the operating frequency of 38.5 GHz. For example, for the electric field at 45 degrees (i.e., E-plane) 45°, the vertical ports (V port) 1, 3, 5, 7 are for the higher operating frequency of 38.5 GHZ, and the vertical ports 9, 11, 13, 15 are for the lower operating frequency of 28 GHz. In addition, for the electric field at 135 degrees (i.e., E-plane) 135°, the horizontal ports 2, 4, 6, 8 are for the higher operating frequency of 38.5 GHZ, and the vertical ports 10, 12, 14, 16 are for the lower operating frequency of 28 GHz.

More specifically, the antenna package structures described in the embodiments of FIGS. 1 to 4 may support multiband FSS OAM. With such design of the antenna patterns shown in FIG. 5, the low-frequency zeroth-order mode of orbital angular momentum (OAM) may be slightly affected, but the low-frequency positive/negative Nth-order modes of orbital angular momentum are not affected.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An antenna package structure, comprising:

a first antenna; and a first frequency selective surface structure, disposed above the first antenna, the first frequency selective surface structure comprising:

a first group, having a plurality of first patterns, and configured to electrically couple to the first antenna; and a second group, having a plurality of second patterns, wherein a combination of a portion of the plurality of second patterns is configured to be substantially equal to one of the plurality of first patterns, and is electrically coupled to the first antenna;

a second antenna, adjacent to the first antenna, wherein the second antenna is geometrically distinct from the first antenna, and is electrically coupled to the plurality of second patterns;

a second frequency selective surface structure, disposed between the plurality of second patterns and the second antenna, and configured to increase gain of the second antenna and to be electrically coupled to the plurality of second patterns;

a first dielectric structure disposed between the second frequency selective surface structure and first frequency selective surface structure;

a second dielectric structure disposed between the second frequency selective surface structure and the second antenna, wherein a first equivalent dielectric constant of the first dielectric structure is greater than a second equivalent dielectric constant of the second dielectric structure, wherein the second dielectric structure comprises:

a first dielectric element; and a second dielectric element disposed between the first dielectric element and the second antenna, wherein a first dielectric constant of the first dielectric element is greater than a second dielectric constant of the second dielectric element;

wherein the first dielectric structure comprises:

a third dielectric element; and a fourth dielectric element, disposed between the third dielectric element and the second dielectric structure, and a third dielectric constant of the third dielectric element is greater than a fourth dielectric constant of the fourth dielectric element.

2. The antenna package structure of claim 1, wherein a first geometric center of the second group substantially aligns with a second geometric center of the second antenna.

3. The antenna package structure of claim 1, wherein a first pitch between two neighboring first patterns of the plurality of first patterns is greater than a second pitch between two neighboring second patterns of the plurality of second patterns.

* * * * *